United States Patent [19]

Hu

[11] Patent Number: 4,671,231
[45] Date of Patent: Jun. 9, 1987

[54] UNIDIRECTIONAL ROTARY PISTON INTERNAL COMBUSTION ENGINE

[76] Inventor: Eugene S. Hu, 9916 Xerxes Ave. S., Bloomington, Minn. 55431

[21] Appl. No.: 828,850

[22] Filed: Feb. 12, 1986

Related U.S. Application Data

[63] Continuation of Ser. No. 521,649, Aug. 9, 1983, abandoned, which is a continuation-in-part of Ser. No. 278,424, Jun. 29, 1981, abandoned.

[51] Int. Cl.⁴ .............................................. F02B 53/00
[52] U.S. Cl. ................................... 123/237; 418/115; 418/198; 418/225; 418/248
[58] Field of Search ................ 123/237, 248; 418/151, 418/225, 248, 198, 115

[56] References Cited

U.S. PATENT DOCUMENTS

| | | |
|---|---|---|
| 1,094,284 | 4/1914 | Wilkie . |
| 1,156,697 | 10/1915 | Lamar ................................. 123/237 |
| 1,216,378 | 2/1917 | Thomas . |
| 1,235,786 | 8/1917 | Fleming . |
| 1,281,621 | 10/1918 | Marion ................................ 123/237 |
| 1,949,225 | 2/1934 | Van Lammeren ............... 123/237 X |
| 2,653,581 | 9/1953 | Schubert ......................... 418/248 X |

FOREIGN PATENT DOCUMENTS

| | | |
|---|---|---|
| 16203 | 1/1982 | Japan . |
| 377380 | 7/1932 | United Kingdom . |
| 1531541 | 11/1978 | United Kingdom . |

*Primary Examiner*—Michael Koczo
*Attorney, Agent, or Firm*—Palmatier & Sjoquist

[57] ABSTRACT

The unidirectional piston internal combustion engine is composed of a stator and a rotor. Annular grooves are cut on the rotor. Each groove is partitioned with a revolving valve gate to form into one "cylinder" between the rotor and the stator. Pistons are inserted into the cylinders and fixed on the rotor while the valve gates are incorporated in the stator. When the rotor turns, the pistons move relatively with the valve gates, which open to let the pistons pass and close again. The valve gates are operated directly by the pistons. Every two adjacent cylinders are made of a group, one for air compressing and one for combustion and expansion. For each group of cylinders, a one-way air passage valve is provided for compressed air to enter into the combustion and expansion cylinder, and is incorporated in the stator. Inlet and outlet ports are made in the stator. Seals for the valve gates, pistons and between grooves are developed to secure high pressure against leakage.

6 Claims, 18 Drawing Figures

UNIDIRECTIONAL ROTARY PISTON INTERNAL COMBUSTION ENGINE This is a continuation of U.S. application Ser. No. 521,649, filed Aug. 9, 1983, abandoned, which was a continuation-in-part of U.S. application Ser. No. 278,424, filed June 29, 1981, abandoned.

BACKGROUND OF THE INVENTION

1. Field of the Invention

The unidirectional piston internal combustion engine is a new kind of piston engine, quite different from the conventional reciprocating piston engine. It can also be termed rotary engine, because it is composed of a stator and a rotor. However, due to the fact that it is designed in the pure light of, and by extended application of, the simple principle of piston and cylinder, without eccentric shafts and complicated compartments, it is proper that it be termed unidirectional piston engine.

2. Description of the Prior Art

No unidirectional piston engine has ever been known to applicant. However, there is related prior art—the conventional reciprocating piston engines which have their inherent disadvantages, such as the inertia loss, and has only about 30% economical efficiency.

SUMMARY OF THE INVENTION

The unidirectional piston engine is invented with the aim of overcoming the existing disadvantages of the reciprocating piston engine: to eliminate the inertia loss of the piston assembly and the connecting rod by unidirectional motion of the piston assembly, to increase power-to-volume ratio by eliminating the connecting rod and the crank shaft, and to increase efficiency to deriving more useful power from the fuel with sufficient supply of compressed air for combustion and expansion and by full expansion of the hot gas.

The unidirectional piston engine is composed of a stator and a rotor, with annular grooves cut around the rotor and partitioned with valve gates into sections to serve as ∓cylinders." Pistons are inserted into the cylinders and fixed on the rotor while the valve gates are incorporated on the stator.

The existing piston internal combustion engines, such as used on vehicles, have only about 30% economical efficiency due to the following facts:

(1) Inertia loss: the inertia loss due to reciprocating motion of the piston and connecting rod is proportional to the product of the mass of the piston assembly and the connecting rod times the linear speed squared, or the loss $\alpha m.v.^2$. So, when the speed is very high, the inertia loss is tremendous.

(2) Insufficient air to absorb all the heat to become energized media to do work: the air sucked into the hot cylinder is rather limited and insufficient to absorb all the heat emitted from combustion of the fuel as to become energized media to expand and push the piston, and consequently the larger portion of the heat is absorbed with cooling water or air to do negative work, which is a pity. Comparing the air consumption of the gas turbine, which can achieve higher efficiency by using many times more air than the conventional piston engine, the reciprocating piston engine should use much more air, but has no way of taking in more air as required unless an additional supercharger is used to assist in taking in more air, but this is not always practical, as it involves the compression ratio, compression stroke, cylinder length, power-to-volume ratio, and total mechanical efficiency loss.

(3) Limited expansion: the piston stroke is rather limited and so the energized media cannot fully expand to derive more useful power.

Another disadvantage of the reciprocating piston engine is the small power-to-volume ratio. So the same capacity piston air compressor is much greater than the same capacity screw type air compressor or centrifugal type air compressor.

As to gas turbine, it also has a big disadvantage: over 60% of its useful power is consumed on air compression, because it is an external combustion engine, and so the air has to be compressed into the high-pressure combustion chamber, thus consuming too much useful power.

The unidirectional piston engine can overcome all the above-mentioned disadvantages through the following features:

(1) To eliminate the inertia loss of the piston assembly and connecting rod by unidirectional motion of the piston assembly;

(2) To increase power-to-volume ratio by eliminating the connecting rod and the crankshaft;

(3) To increase efficiency by deriving more useful power from the fuel with sufficient supply of compressed air for combustion and expansion and by full expansion of the hot gas.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 8A and 8B form an ideal work diagram.

FIG. 9A is a 9A—9A sectional view of FIG. 9B.

DESCRIPTION OF THE PREFERRED EMBODIMENTS

The unidirectional piston engine is composed of a stator (housing) and a rotor, which is accommodated in and mounted at both ends on the stator. Annular grooves are cut around the rotor. The grooves are further partitioned with valve gates into sections for "cylinders". Pistons are inserted into the cylinders and fixed on the rotor while the valve gates are incorporated in the stator. The valve gates are directly operated by adapted pistons. Every two adjacent cylinders are made a group, one for air compressing and one for combustion and expansion. For each group of cylinders, a one-way air passage valve is provided for compressed air to enter into the combustion and expansion cylinder, and is incorporated in the stator. Inlet and outlet ports are made in the stator.

Figure 1:
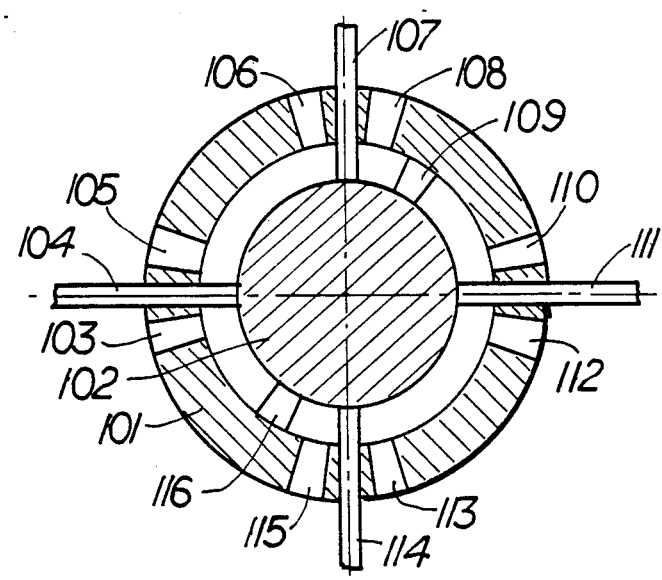
FIG. 1 is a principal drawing, showing a cross-section view of a unidirectional piston motor with annular grooves cut into the rotor and with pistons fixed in the groove. The groove is further partitioned into sections with valve gates, which can be operated to let the pistons pass. Inlet and outlet ports are provided as shown.

FIG. 1 illustrates a unidirectional piston hydraulic motor composed of a stator 101, a rotor 102, four valve gates 104, 107, 111, and 114, two pistons 109 and 116, four inlet ports 105, 108, 112, and 115, and four outlet ports 103, 106, 110 and 113. As shown, ports 103 and 115 are open and so piston 116 is propelled to move clockwise. When piston 116 is approaching valve gate 104, this valve gate opens to let piston 116 pass and closes again, and port 105 opens to allow hydraulic fluid to flow in to propel piston 116 to move continuously and unidirectionally. In the same manner, piston 109 and ports close to it operate in the opposite side.

FIGS. 2-6 illustrate the internal combustion engine basically composed of a stator 1 and a rotor 2 accommodated in the stator, mounted at both ends in the thrust bearings 41 and 42 in both ends of the stator.

The stator has one end cast together and one end cast separately but fixed together after machining and assembling. On both ends there are cast holes at the center for the thrust bearings 41 and 42 and holes 14 and 43 around the center for air to flow in and out. On top of the stator there is a ridge for the seats of valve gates 9 and one-way compressed air passages 27.

The rotor is a cast cylinder, with one end cast together and one end cast separately but fixed together after machining and assembling. Around the rotor, grooves 4, 6, 18, and 11 are cut, seal rings 3, 5, 8, 10 and 12 are inserted, and a hole 7 in the center is provided for cooling, hereafter called as cooling conduit. At both ends of the rotor there are projection for axles, and holes 14 and 43 around the axles for the flow of cooling air. Mounted on the front end of the rotor is a fan propeller 13 to draw air to flow through the center and out at the rear end.

Figure 2A:
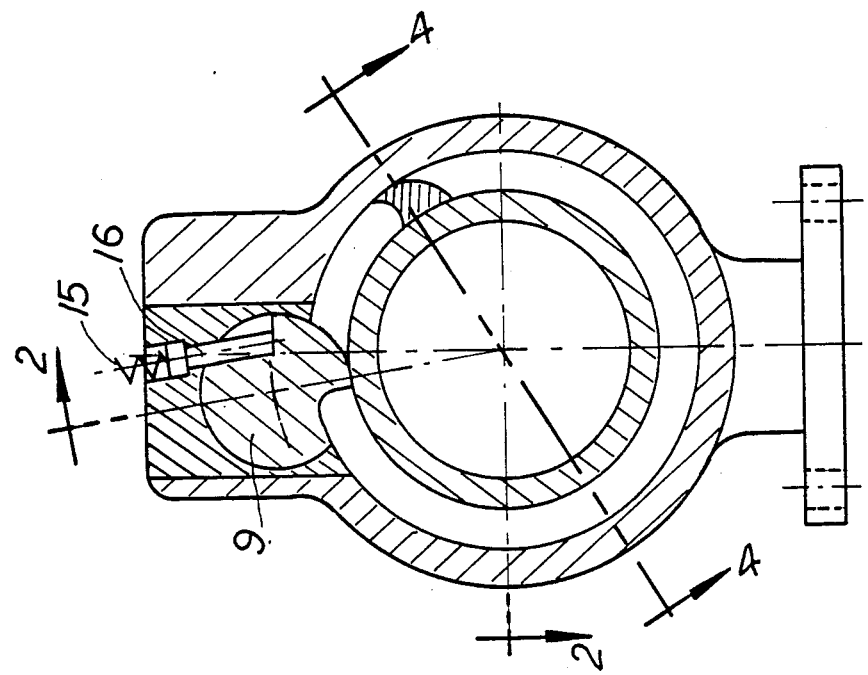
FIG. 2A is a 2A—2A section view of FIG. 2, showing the to-and-fro revolving valve gate and the piston.
Figure 2:
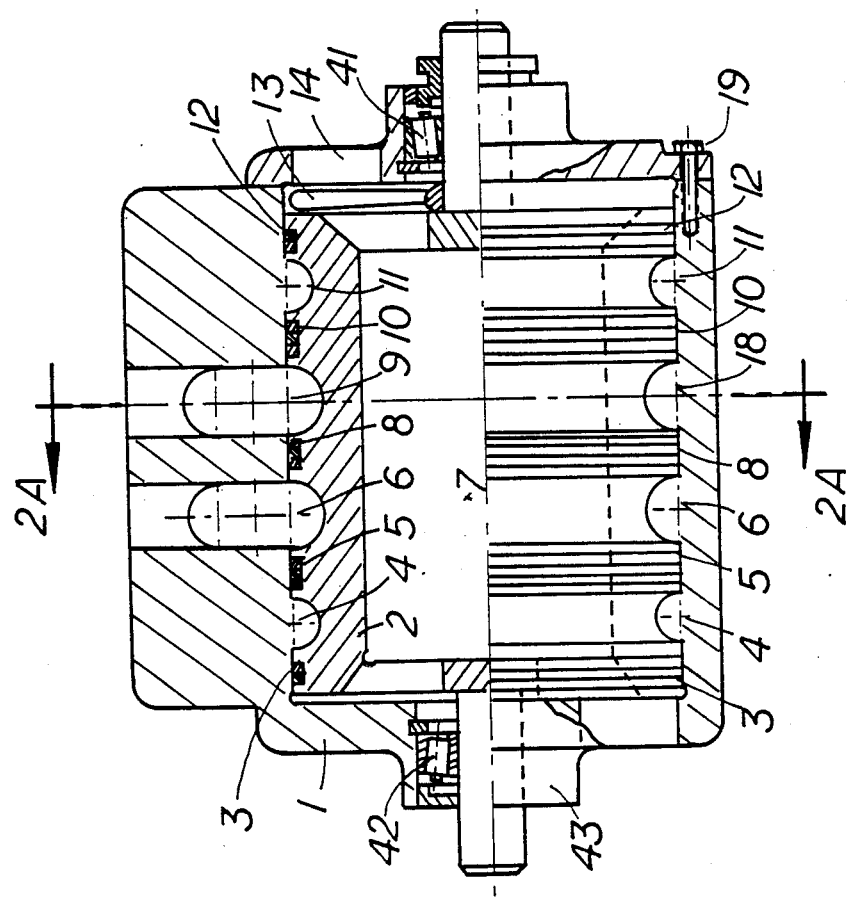
FIG. 2 is a front sectional view of a unidirectional piston internal combustion engine taken along line 2—2 of FIG. 2A, showing the stator (housing) and the rotor with annular grooves (corresponding to cylinders).
Figure 3:
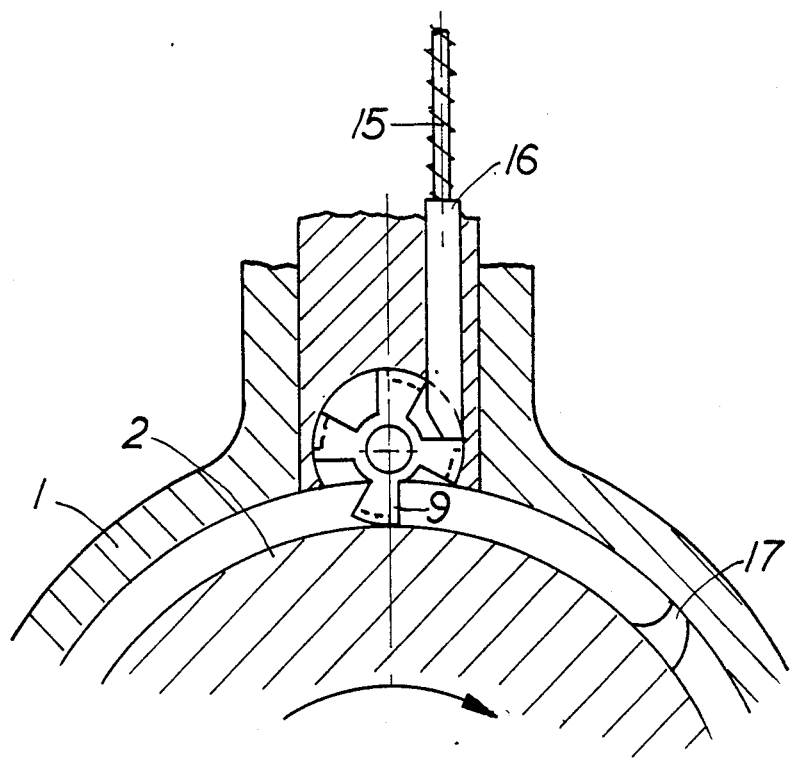
FIG. 3 is a sectional view of a unidirectional revolving valve gate and its accessories. It also shows the slots in the valve gate which will engage with the projection in the front of the piston to trap a small amount of air as an air cushion.
Figures 6, 6A:
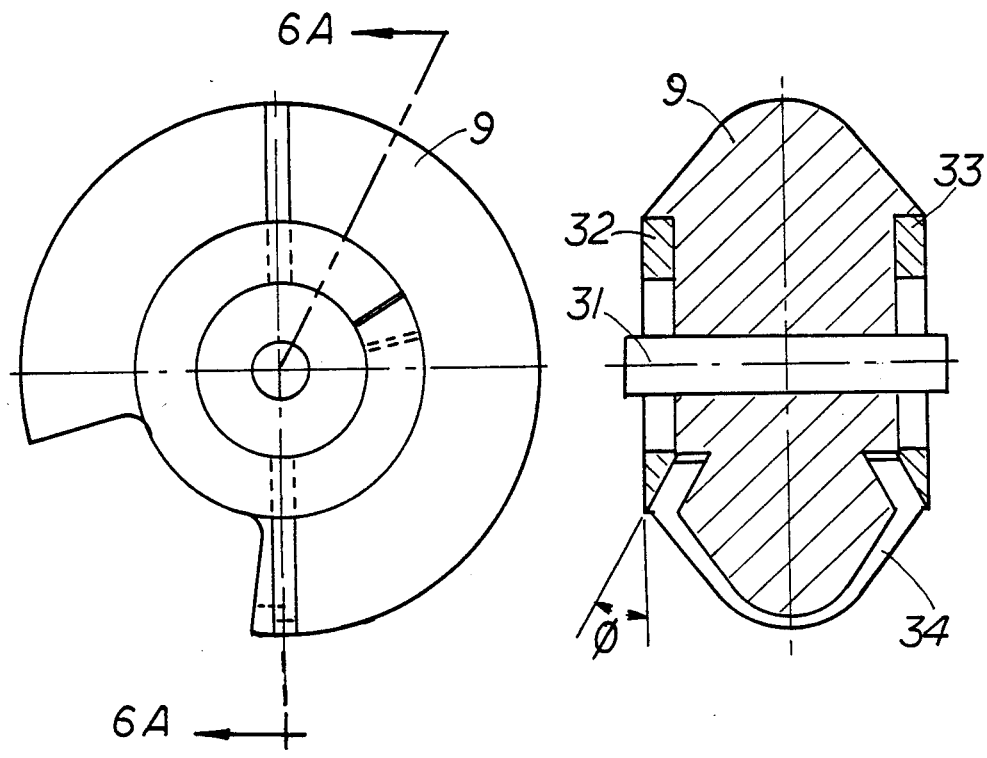
FIG. 6 is a side view of the to-and-fro revolving valve gate.
FIG. 6A is a cross-sectional view taken along line 6A—6A of FIG. 6, showing the horseshoe seals and the seal rings on the valve gate.

The valve gate 9 is either of the to-and-fro revolving type as shown in FIG. 2 or unidirectional revolving type as shown in FIG. 3. Both revolving valve gates have a regulator 16 and a regulator compression spring 15 which protrudes to facilitate dissipation of heat. On the valve gate there are horseshoe seals 34 and seal rings 32 and 33 as shown in FIGS. 6 and 6A. The horseshoe seals are made slightly larger in size than required to engage with the grooves on the rotor and forced into the slots in the valve gate body and then retained with its two bending ends, which with proper bending angle $\phi$ have an additional function to allow the seal to expand out to compensate the wear evenly and to press the seal rings outward through the slant slots in the seal ring, with which the bending ends of the horseshoe seal engage.

Figure 6B:
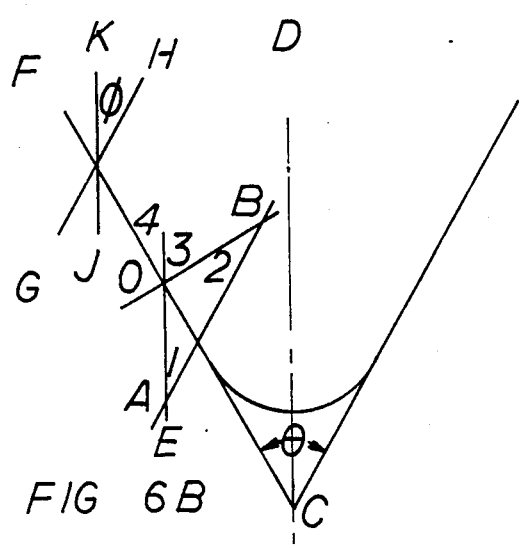
FIG. 6B is an analytical diagram of the horseshoe seal to determine the bending angle $\phi$ as shown in FIG. 6A.

The proper bending angle $\phi$ is obtained through analysis shown in FIG. 6B, as follows:

Make OB$\perp$FC, OE//DC, and let OA=OB
Make GH//AB, KJ//DC
Since $\angle 3 = \angle 1 + \angle 2$, and $\angle 1 = \angle 2$
So, $\angle 3 = 2\angle 1$
Since $\angle 4 = \frac{1}{2}\angle \theta$ and $\angle 4 = 90° - \angle 3$
So, $\frac{1}{2}\angle \theta = 90° - \angle 3$, but $\angle 3 = 2\angle 1$
So, $\frac{1}{2}\angle \theta = 90° - 2\angle 1$, or $\angle 1 = 45° - \frac{1}{4}\angle \theta$
Since $\angle \phi = \angle 1$
So, $\angle \phi = 45° - \frac{1}{4}\angle \theta$ Here $\angle \theta$ is the angle formed by the two tangent walls of the groove. If $\angle \theta = 0$ (for half round or U-shaped grooves), then $\angle \phi = 45°$.

When $\angle \theta = 60°$ (for 60° flared U-shaped grooves), then $\angle \phi = 30°$.

When $\angle \theta$ approaches 180°, then $\angle \phi$ approaches 0.

The valve gate regulator 16 as shown in FIGS. 2A and 3 makes the revolving valve gate stop at a desired position every time after revolving. It has a disc head to stop and to trap a small amount of air in the sink hole as an air cushion.

Figure 4:
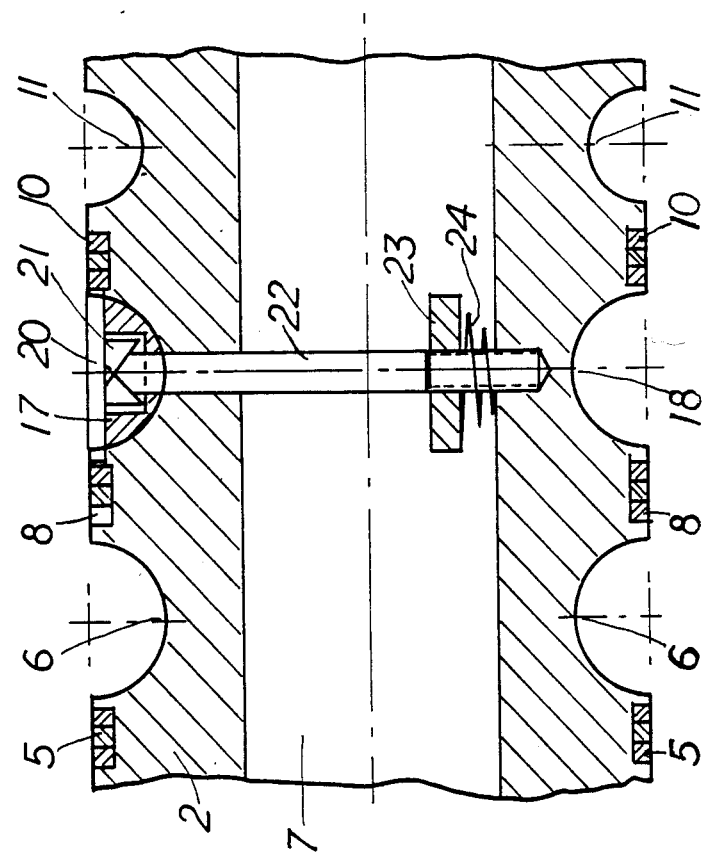
FIG. 4 is a partial 4—4 sectional view of FIG. 2A, showing the piston seal (sealing bars) and the piston seal pressing rod.
Figure 5:
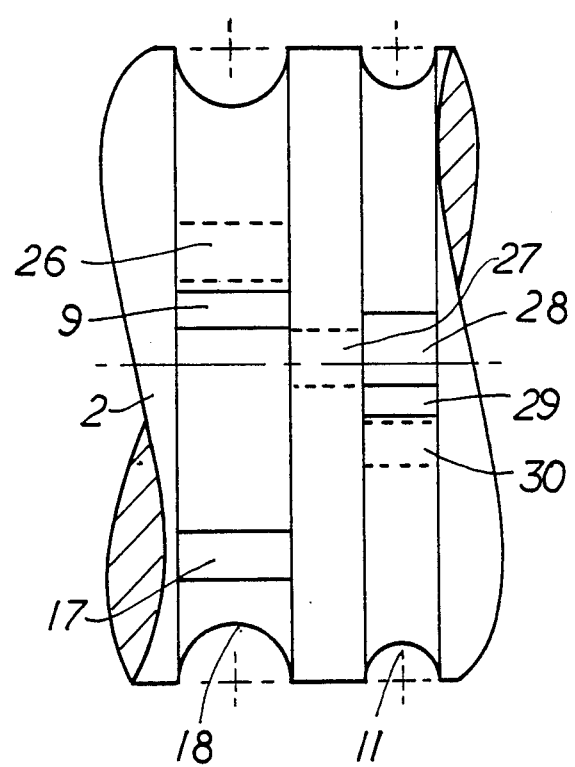
FIG. 5 is a diagram of development, showing the relative positions of the valve gates, pistons, one-way compressed air passage, inlet port and outlet port of a pair of the grooves which work together as a group, with one for air compression and one for combustion and expansion.

The pistons 17, 28, (as shown in FIGS. 4 & 5), 44, and 45 (not shown) are fixed in the grooves. The piston has piston seals 20 which are composed of two parts (one is completely seen, one behind can be seen just a small amount of the left end) and which are pressed outward against the inner surface of the stator and also sideways against the seal rings 8 and 10 by the wedge point of the piston seal pressing rod 22 which is in turn pressed by the spiral compression spring 24 located between the opposite inner wall surface of the rotor and the large nut 23, which serves also as a counterweight. When the RPM of the rotor increases, the centrifugal force of the counterweight will reduce pressure of the piston seal pressing rod on the piston seal to avoid excessive wear. On the piston seals at the center there are slanted projections 21 which engage with the wedge point of the piston seal pressing rod, so the piston seals can be pressed outwardly and also sideways.

The relative positions of the air compressing groove 18, the combustion and expansion groove 11, the piston 17, valve gate 9 and air inlet 26 of the air compressing groove, the one-way compressed air passage disc 27, the piston 28, valve gate 29 and exhaust outlet 30 of the combustion and expansion groove are arranged as shown in FIG. 5. It is noted that the valve gate 9 of the air compressing groove 18 is ahead of the valve gate 29 of the combustion and expansion groove 11 in the direction of the rotor's rotation, and the farther apart the two valve gates 9 and 29 are, the closer the two pistons 17 and 28 are. This principle gives flexibility to arranging the seats of the valve gates. One valve gate for the air compressing groove, one valve gate for the combustion and expansion groove and one compressed air passage valve between them can be made as an assembly as shown in FIGS. 9A-9C wherein valve gate 9 for air compression, valve gate 29 for combustion and expansion, and the revolving valve or disc 27 for the passage are shown.

Figure 9B:
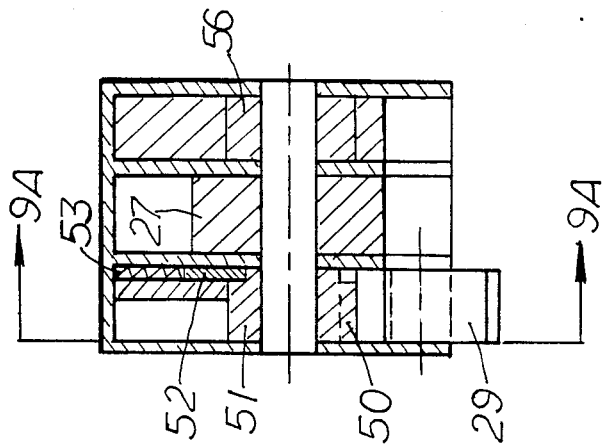
FIG. 9B is a 9B—9B sectional view of FIG. 9A.
Figure 9C:
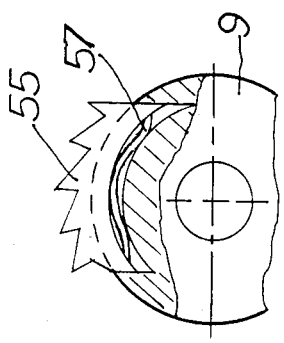
FIG. 9C shows the ratchet band attached to the revolving valve gate.
Figure 9A:
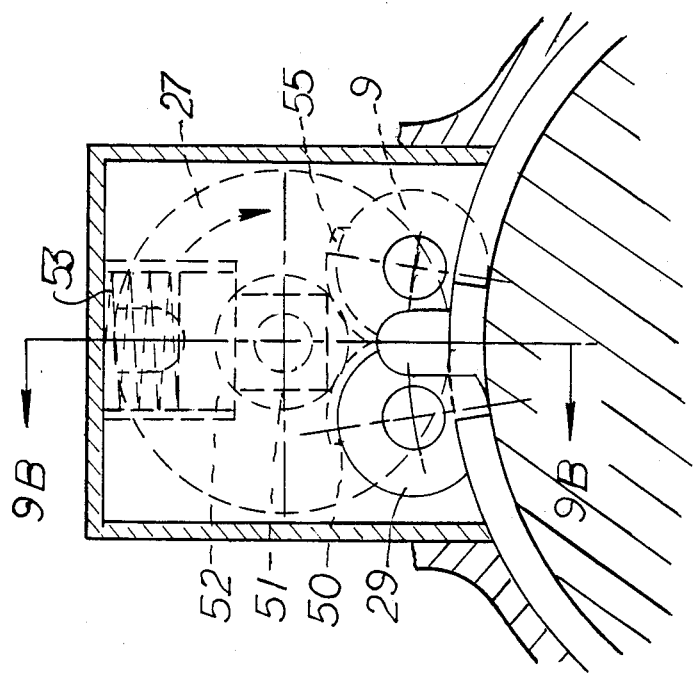
FIG. 9A shows an assembly of the one-way compressed air passage together with the revolving valve gates for the two adjacent grooves (air compression and combustion).

In FIGS. 9A and 9B, which show an assembly of the one-way compressed air passage together with the two related revolving valve gates, the one-way compressed air passage disc 27 is made with two slots cut by the circumference at 180° apart for the compressed air to pass through. At both ends of the disc axle, there are hubs 51 and 56 which engage with the ratchet bands 50 and 55 on the revolving valve 29 and 9. FIG. 9C shows the ratchet band 55 more clearly with a known waved leap spring 57 underneath. Likewise, ratchet band 50 is made and attached to the revolving valve gate 29. So, when the piston passes through the revolving valves, the revolving valves cause the one-way passage disc 27 to turn an angle between 50°-90°, and then the regulator 52 together with the regulating spring 53 will press on the square hub end 51 to turn exactly 90°. As a result, when the valve 29 turns to let the piston 28 pass, it also turns the passage disc 27 to open, and when the valve 9 turns to let the piston 17 pass, it also turns the passage disc 27 to close. The passage disc 27 turns in one direction, and the revolving valves 9 and 29 turn to-and-fro.

The grooves 4, 6, 18 and 11 as shown in FIG. 2 are cut around the rotor and cut in pairs, at least one pair. Each pair includes one air compressing groove and one combustion and expansion groove. The former is larger is size then the latter. Since there is thrust along the axis when the compressed air passes from the air compression grooves 6 and 18 into the combustion and expansion grooves 4 and 11, the two air compression grooves 6 and 18 are cut adjacent, and so the sideway thrust can offset each other, when the piston and valve gates are properly arranged.

Figure 8A:
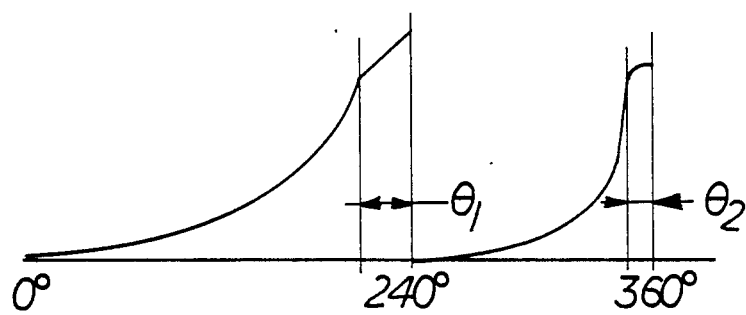
FIG. 8A shows the pressure curve of the compressed air in the air compressing groove, wherein twice entries of compressed air to the combustion and expansion groove are shown.
Figure 8B:
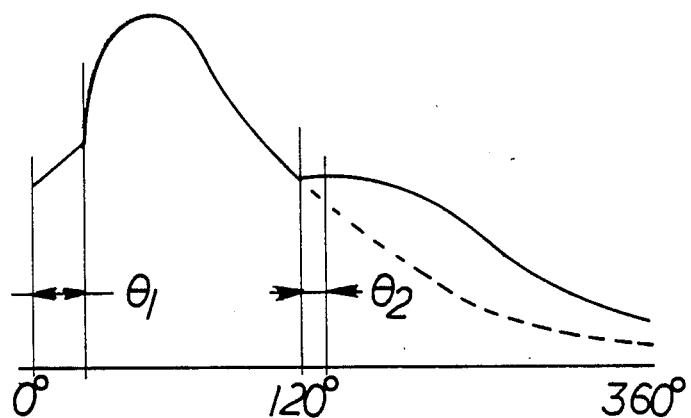
FIG. 8B shows the pressure curve of compressed and hot gas in the combustion and expansion groove. $\theta_1$ and $\theta_2$ are the degrees of revolution of the rotor, wherein twice of compressed air enter into the combustion and expansion groove.

As an alternative for greater energy saving, an additional piston is added to the air compression groove about 180° behind the original piston 17, and in this case a shallow curved piston matching the valve shape for sealing purpose should also be added to the combustion and expansion groove to push the revolving valve gate to operate the one-way compressed air passage valve the same degrees that the original piston 28 can, as the latter can be made merely partially effective to operate the passage valve. Instead of the shallow curved piston put in the combustion and expansion groove, an additional dummy valve gate can be put in the air compression groove in the same plane with the valve gate in the combustion and expansion groove. The dummy valve gate is just a frame, not for partition, but for turning the one-way compression air passage. With this dummy valve gate there is no need for the revolving valve gate in the combustion and expansion groove to operate the one-way compressed air passage at all. In this way the compressed air enters into the combustion and expansion groove twice a revolution, once to mix the fuel into stoichiometric mixture for combustion and once to absorb heat from the engine for full expansion to derive more useful power and at the same time to cool the engine. The ideal work diagram for the above-described alternative is shown in FIGS. 8A and 8B. FIG. 8A shows the air compression work diagram, and FIG. 8B shows the combustion and expansion work diagram. FIG. 8B minus FIG. 8A is the net work done. $\theta_1$ is the angle of revolution between the two valve gates 16 and 8, and $\theta_2$ is the angle of revolution during which period the compressed air enters into the combustion groove at the second time. It should be noted that there is a shift of angle between the air compressing and combustion grooves.

Figure 7:
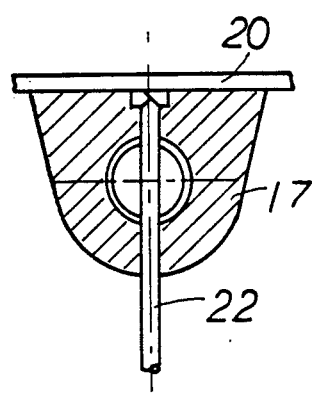
FIG. 7 is a cross-section view of the piston taken along line 7—7 of FIG. 7A.

Still another feasible alternative to achieve high efficiency at all speeds of the engine by keeping the grooves working always at the optimum condition is to vary the number of operating grooves to meet the changing power requirements: to shut off some grooves when power required is low, and to activate some more grooves when the power required is high, instead of varying the fuel air amount at the sacrifice of proper compression ratio and proper stoichiometric mixture density in all the grooves as to result in low efficiency. This can easily be done with this kind of engine by "gradually" releasing the accelerator to stop some fuel injectors and to close some air inlets to some air-compressing grooves to avoid power consumption on air compression, when power required is low; and vice versa. However, the efficiency gained in this manner would be offset by the vacuum suction behind the piston, unless a vacuum eliminating piston is designed. FIGS. 7–7C show the vacuum eliminating piston.

Figure 7A:
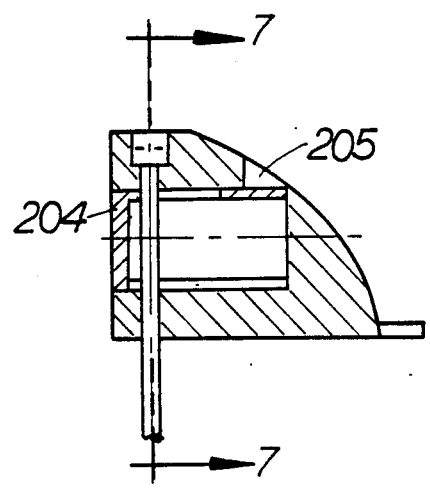
FIG. 7A is a side-section view of the vacuum eliminating piston.

Referring to FIGS. 7 and 7A, the vacuum eliminating piston has the piston body 17, and piston seal 20, the piston seal pressing rod 22, and vacuum eliminating valve 204, and the air inlet 205. Where there is a vacuum occurring behind the piston the vacuum eliminating valve 204 will be sucked to slide out a little, and then the air will flow in through the air inlet 205 to the space behind the piston to eliminate the vacuum. When the piston passes the revolving valve gate, the valve gate will push the vacuum eliminating valve back so it can work again.

Figure 7B:
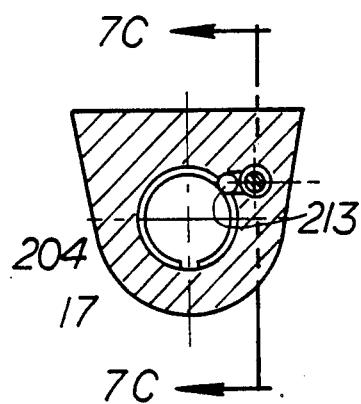
FIG. 7B is a cross-section view taken along line 7B—7B of FIG. 7C, showing the locking device to the vacuum elimimating valve in the valve gate.
Figure 7C:
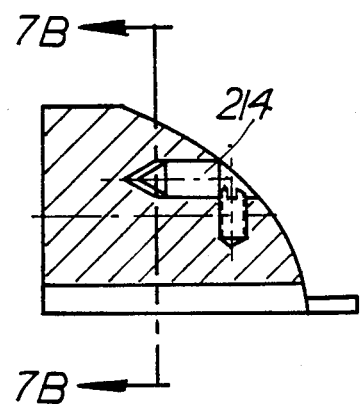
FIG. 7C is a side-section view of the piston taken along line 7C—7C of FIG. 7B.

Referring to FIGS. 7B and 7C, the vacuum eliminating piston 17 has a locking device to lock the vacuum eliminating valve 204. The locking device consists of a steel ball 213 and cone-point pin 214. When the air compressing groove is at work, the compressed air in the front of the piston will press the cone-point pin to press the steel ball to lock the vacuum eliminating valve 204.

Relative position of the pistons: for two-grooves engine, the piston in the air compressing groove should be lagging behind the piston in the combustion and expansion groove by a distance, which together with the distance between the two valve gates equals the distance for transferring and further compressing the compressed air into the combustion and expansion groove, also equals the distance between the valve gate and the piston in the combustion and expansion groove when ignition takes place, and also equals 30 to 90 degrees of revolution of the rotor depending on economical efficiency and/or power to volume ratio desired; for four-, six-, and eight-grooves engine, the pistons in each group of grooves should be fixed respectively after the pattern of those in the two-grooves engine, except that the pistons in the combustion and expansion grooves should be fixed first and spaced with each other at 180, 120 and 90 degrees apart respectively, and so forth; and The two-valve-gates-and-the-air-passage-valve assemblies are to be put in the seats on top of the stator, either in one straight line with the pistons in various grooves located in different positions around the rotor as outlined in the preceding paragraph, or staggered into two lines to make more room for accommodation of these assemblies with the position of the pistons so properly adjusted accordingly as to make the intervals between each ignition remain equal.

Having thus described my invention I claim:

1. A unidirectional piston internal combustion engine, comprising:
   (a) a stator forming a housing with a longitudinally oriented cylindrical inner cavity having a separable end with a ridge on the stator adapted for seating revolving valve gates and a one-way compressed air passage valve and means for mounting and cooling the stator;
   (b) a cylindrical rotor rotatably mounted in the cavity of the stator having a separable end, at least one pair of two adjacent annular grooves cut around the rotor wherein one groove is cut larger in size for air compressing and the other groove is cut smaller in size for combustion and expansion and means for mounting, sealing and cooling the rotor within the cylindrical cavity;
   (c) a piston fixed in each groove and comprised of a piston body fixed within the groove, a piston seal on top of the piston body to seal the piston body to the inner cavity of the stator, a piston seal pressing rod passing through the piston engaging the seal, and a counterweight affixed onto the pressing rod;
   (d) the revolving valve gates, one for each groove, being mounted to the ridge of the stator each having a gate blade extending into its respective groove on the rotor to form a working chamber between the gate and the piston for air compressing or for combustion and expansion respectively and further being adapted to permit the piston to pass;
   (e) an air inlet and an exhaust outlet for each pair of grooves on the rotor, the air inlet being located in the stator adjacent the front side of the revolving valve gate for the air compressing groove in the rotating direction of the rotor and the exhaust outlet being located in the stator adjacent the rear side of the revolving valve gate for the combustion and expansion groove;
   (f) a one-way compressed air passage for each pair of grooves on the rotor formed in the ridge; and
   (g) the one-way compressed air passage valve mounted in the one-way compressed air passage in the ridge to control the one-way compressed air passage between the grooves.

2. The unidirectional piston internal combustion engine of claim 1, wherein the revolving valve gates are further characterized as to-and-fro revolving valve gates each comprised of a disc-like valve gate body with approximately one-quarter cut off at its outside portion to match and engage with the piston, a shaft passing through the center of the valve body, two horse-shoe seals spaced approximately 180 degrees apart with each of their two bent ends retained on the valve body and adapted to expand outwardly to compensate for even wear with the angle of the bent end calculated by the following formula, $\angle\theta=45°-\frac{1}{4}\angle\theta$, wherein $\angle\theta$ being the angle of the bent end to the center line of the horse-shoe seal and $\angle\theta$ being the angle formed by the two tangent walls of the groove on the rotor, further including two seal rings at either side of the disc-like valve body and a regulator mounted in the ridge comprised of a bar engaging the valve body and held thereat by a compressing spring for controlling the rotation of the revolving valve gates.

3. The unidirectional piston internal combustion engine of claim 1, wherein the revolving valve gates are further characterized as unidirectional revolving valve gates each comprised of a disc-like valve gate body with four cut-off portions at its outside portion in four quadrants forming four gate blades to match and engage with the piston, a shaft passing through the center of the valve body, two horse-shoe seals spaced approximately 180 degrees apart with each of their two bent ends retained on the valve body and adapted to expand outwardly to compensate for even wear with the angle of the bent end calculated by the following formula, $\angle\theta=45°-\frac{1}{4}\angle\theta$ wherein $\angle\theta$ being the angle of the bent end to the center line of the horse-shoe seal and $\angle\theta$ being the angle formed by the two tangent walls of the groove on the rotor, further including two seal rings at either side of the disc-like valve body and a regulator mounted in the ridge comprised of a bar engaging the valve body and held thereat by a compressing spring for controlling the rotation of the revolving valve gate.

4. The unidirectional piston internal combustion engine of claim 1, further comprising a second piston fixed in the air compressing groove approximately 180° behind the first piston to derive more useful power and at the same time to cool the engine.

5. The unidirectional piston internal combustion engine of claim 1, wherein the one-way compressed air passage valve comprises a rotating disc with two slots cut across its circumference at a space of approximately 180 degrees apart for compressed air to pass through, a shaft passing through the center of the disc, two hubs made into ratchet wheels at either side of the disc, two ratchet bands attached respectively to the revolving valve gates at either side of the one-way air passage valve and a regulator mounted in the ridge comprising a bar engaging one of the hubs and held thereat by a compressing spring for controlling the rotation of the one-way compressed air passage disc.

6. The unidirectional piston internal combustion engine of claim 1, further comprising a regulator for each valve gate comprised of a bar engaging the valve gate and a mounted in the ridge with an abutting regulator compression spring for controlling the rotation of one of the revolving valve gate by biased engagement therewith, said regulator compression spring protrudes to facilitate dissipation of heat.

* * * * *